US007266146B2

United States Patent
Pare, Jr. et al.

(10) Patent No.: US 7,266,146 B2
(45) Date of Patent: Sep. 4, 2007

(54) SYMBOL-BASED DECISION FEEDBACK EQUALIZER (DFE) OPTIMAL EQUALIZATION METHOD AND APPARATUS WITH MAXIMUM LIKELIHOOD SEQUENCE ESTIMATION FOR WIRELESS RECEIVERS UNDER MULTIPATH CHANNELS

(75) Inventors: Thomas Edward Pare, Jr., Mountain View, CA (US); Chien-Cheng Tung, Fremont, CA (US); Cedric Choi, San Jose, CA (US)

(73) Assignee: Ralink Technology, Inc., Cupertino, CA (US)

( * ) Notice: Subject to any disclaimer, the term of this patent is extended or adjusted under 35 U.S.C. 154(b) by 767 days.

(21) Appl. No.: 10/402,710

(22) Filed: Mar. 28, 2003

(65) Prior Publication Data

US 2003/0231709 A1    Dec. 18, 2003

Related U.S. Application Data

(60) Provisional application No. 60/389,874, filed on Jun. 18, 2002.

(51) Int. Cl.
*H03H 7/40* (2006.01)
(52) U.S. Cl. .................................... 375/232; 375/233
(58) Field of Classification Search ......... 375/229–236
See application file for complete search history.

(56) References Cited

U.S. PATENT DOCUMENTS

| 5,031,195 | A | * | 7/1991 | Chevillat et al. ............ 375/234 |
| 5,353,307 | A | * | 10/1994 | Lester et al. ................. 375/233 |
| 5,546,430 | A | * | 8/1996 | Liao et al. ................... 375/341 |
| 5,822,143 | A | * | 10/1998 | Cloke et al. .................. 360/65 |
| 6,011,813 | A | * | 1/2000 | Ghosh ......................... 375/233 |
| 6,201,832 | B1 | * | 3/2001 | Choi .......................... 375/233 |
| 6,246,732 | B1 | * | 6/2001 | Kobayashi et al. ......... 375/346 |
| 6,327,302 | B1 | * | 12/2001 | Shen .......................... 375/232 |
| 6,678,319 | B1 | * | 1/2004 | Jamali ........................ 375/234 |
| 6,707,850 | B1 | * | 3/2004 | Blake et al. ................. 375/233 |
| 6,775,322 | B1 | * | 8/2004 | Zangi et al. ................. 375/232 |
| 2003/0099208 | A1 | * | 5/2003 | Graziano et al. ........... 370/286 |
| 2003/0161258 | A1 | * | 8/2003 | Zhang et al. ................ 370/203 |

* cited by examiner

*Primary Examiner*—Chieh M. Fan
*Assistant Examiner*—Jason M. Perilla
(74) *Attorney, Agent, or Firm*—Law Offices of Imam

(57) ABSTRACT

A maximum likelihood sequence estimator (MLSE) equalizer device being included in an MLSE sub-receiver includes a feedforward circuit responsive to input data for processing the same to generate feedforward circuit output, said input data being generated from transmitted data being transmitted by wireless transmission, in accordance with an embodiment of the present invention. The MLSE equalizer device further includes a feedback circuit responsive to said input data for processing the same to generate feedback circuit output. The MLSE equalizer device further includes an equalizer training module responsive to said feedforward circuit output and said feedback circuit output for training said MLSE equalizer device by minimizing the difference between said feedforward circuit output and said feedback circuit output, said MLSE equalizer device being trained to generate equalized data, said MLSE sub-receiver for decoding said equalized data to generate decoded transmitted data by mitigating the effects of multi-path communication channel due to wireless transmission of said transmitted data.

5 Claims, 11 Drawing Sheets

SYMBOL-BASED DECISION FEEDBACK EQUALIZER (DFE) OPTIMAL EQUALIZATION METHOD AND APPARATUS WITH MAXIMUM LIKELIHOOD SEQUENCE ESTIMATION FOR WIRELESS RECEIVERS UNDER MULTIPATH CHANNELS

REFERENCE TO PRIOR APPLICATION

This application claims the benefit of a previously filed U.S. Provisional Application No. 60/389,874 filed on Jun. 18, 2002, and entitled "SYMBOL-BASED DECISION FEEDBACK EQUALIZER (DFE) OPTIMAL EQUALIZATION METHOD AND APPARATUS WITH MAXIMUM LIKELIHOOD SEQUENCE ESTIMATION FOR WIRELESS RECEIVERS UNDER MULTIPATH CHANNELS".

BACKGROUND OF THE INVENTION

1. Field of the Invention

The present invention relates generally to the field of wireless receivers and particularly to optimal equalization method and apparatus with maximum likelihood sequence estimation for wireless receivers under multi-path channels.

2. Description of the Prior Art

As computers have gained enormous popularity in recent decades, so have networking the same allowing for access of files by one computer from another. More recently and with the advent of wireless communication, remote and wireless networking of computers is gaining more and more notoriety among personal users, small and large business owners, factory facilities and the like.

With regard to the wireless networking of personal computers including laptops, a particular modem, namely modems adapted to the IEEE 802.11b industry standard, are commonly employed. That is, an antenna is placed inside or nearby the personal computer and an RF chip receives signal or data through the antenna and an analog-to-digital converter, typically located within the personal computer (PC), converts the received signal to baseband range. Thereafter, a baseband processor is employed to process and decode the received signal to the point of extracting raw data, which may be files transferred remotely and wireless, from another PC or similar equipment with the use of a transmitter within the transmitting PC.

There are several prior art apparatus and techniques for implementing 802.11b modem receivers, however, such prior art have not successfully utilized the fullest potential of the 802.11b modem. For example, the maximum rate of this type of modem device is 11 Mbits/sec. but in the presence of multi-path, use of current prior art methods and apparatus does not allow for reception of data at such rates. In fact, successful reception of data under multi-path conditions currently takes place at rates equivalent to 5.5 Mbits/sec.

Furthermore, in areas other than open locations, such as smaller office cubicles located within the inner structure of a building, prior art receivers are known to only operate at rates lower than that of the maximum operational rate of the modem, such as 11 Mbits/sec., thus preventing a user from receiving files from another PC at optimal rates. This is generally due to the prior art techniques' limitations in operating within multi-path conditions, which occur mostly in closed areas, such as those mentioned hereinabove. Multi-path effects are shown to degrade the detection of data when using prior art techniques and methods.

In light of the foregoing, it is desirable to develop a receiver for receiving 802.11b modem signals accurately and in the presence of multi-path communication channel and modeling uncertainties yet at maximum rates achievable by the modem. The desired receiver should operate at optimal rates without introducing delays or distortions during reception of the modem signals.

SUMMARY OF THE INVENTION

Briefly, an embodiment of the present invention includes a maximum likelihood sequence estimator (MLSE) equalizer device being included in an MLSE sub-receiver having a feedforward circuit responsive to input data for processing the same to generate feedforward circuit output, said input data being generated from transmitted data being transmitted by wireless transmission. The MLSE equalizer device further includes a feedback circuit responsive to said input data for processing the same to generate feedback circuit output. The MLSE equalizer device further includes an equalizer training module responsive to said feedforward circuit output and said feedback circuit output for training said MLSE equalizer device by minimizing the difference between said feedforward circuit output and said feedback circuit output, said MLSE equalizer device being trained to generate equalized data, said MLSE sub-receiver for decoding said equalized data to generate decoded transmitted data by mitigating the effects of multi-path communication channel due to wireless transmission of said transmitted data.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 1:
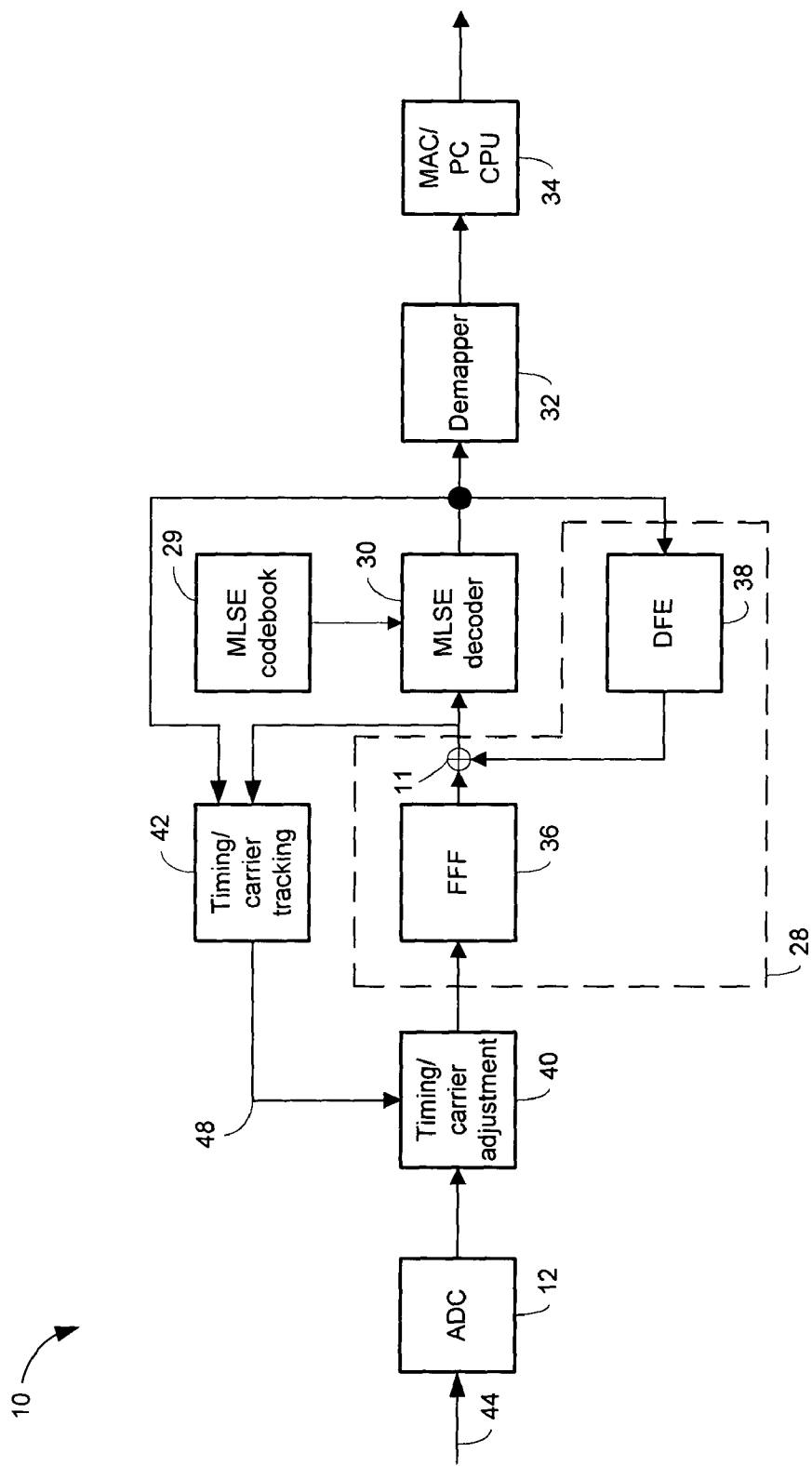
FIG. 1 shows a maximum likelihood sequence estimator (MLSE) receiver system 10 in accordance with an embodiment of the present invention.

Referring now to FIG. 1, a maximum likelihood sequence estimator (MLSE) receiver system 10 is shown to include an analog-to-digital converter (ADC) circuit 12, a timing carrier/adjustment circuit 40, a timing/carrier tracking circuit 42, an MLSE equalizer device 28, an MLSE decoder device 30, an MLSE codebook storage location 29 for storing codebooks, a demapper circuit 32 and a computer central processing unit (CPU) 34. The MLSE equalizer device 28 includes a feedforward circuit 36 and a feedback circuit 38. In one embodiment of the present invention the feedforward circuit 36 is a feedforward fractionally spaced filter (FFF) circuit and the feedback circuit 38 is a decision feedback equalizer (DFE) circuit.

An embodiment of the present invention lies generally in the MLSE decoder device 30 and the MLSE equalizer device 28 and the contents of the MLSE codebook storage location 29, collectively referred to herein as an MLSE sub-receiver. Thus, while a brief discussion will be presented in connection with the remainder of the circuits/devices enumerated hereinabove, the operation of which is generally known to those skilled in the art, emphasis will be placed on the MLSE decoder device 30, the MLSE codebook and some portions of the MLSE equalizer device 28, i.e. the MLSE sub-receiver. Further discussion of the above-mentioned circuits/devices is provided in a U.S. patent application with Ser. No. 10/402,697 entitled "SYMBOL-BASED DECISION FEEDBACK EQUALIZER (DFE) WITH MAXIMUM LIKELIHOOD SEQUENCE ESTIMATION FOR WIRELESS RECEIVERS UNDER MULTI-PATH CHANNELS", filed on Mar. 28, 2003, the inventor of which is Chien-Cheng Tung and the disclosure of which is herein incorporated by reference in its entirety.

As shown in FIG. 1, the ADC circuit 12 is shown to receive a signal, a receiver signal 44, the ADC circuit 12 converts the receiver signal 44 from analog to digital form and couples the latter to the timing/carrier adjustment circuit 40. The latter additionally receives a timing/phase correction signal 48 that it uses for adjusting the timing and phase of the output of the ADC circuit 12. The operation of the timing/carrier adjustment circuit 40 and the timing/carrier tracking circuit 42 is well understood by those of ordinary skill in the art. Ultimately, the output of the timing/carrier adjustment circuit 40 is equalized by the MLSE equalizer 28, the details of which will be described in detail hereinbelow.

The output of the MLSE equalizer device 28 is provided to the MLSE decoder 30 for decoding the output of the device 28 with the aid of the contents of the MLSE codebook storage location 29. The demapper 32 performs the function of bit mapping or data conversion wherein data is converted to actual '1's and '0's (symbol to data conversion) as in the state in which data was initially transmitted to the receiver system 10. The output of the demapper circuit 32 is provided to the Central Processing Unit of the PC or computer 34 for storage thereof or any other use by the user.

The timing/carrier tracking circuit 42 utilizes the output of the MLSE decoder device 30 and the output of the summation junction 11 to correct/adjust the timing/phase of the MLSE decoder device 30. Accordingly, the circuits 40 and 42 are continuously compensating for any phase and/or timing shifts experienced by the received signal 44 resulting from many factors, such as inaccuracies associated with the conversion of the analog format of the signal 44 to digital, phase shifts due to the wireless transfer of the signal 44 from a remotely-located transmitting device, and the like.

The circuits 40 and 42 generally are used to demodulate the received signal 44 by performing carrier and timing recovery.

While a particular type of equalizer is referred thereto in this patent document, in alternative embodiment of the present invention, any filter will work so long as a residual channel response is generated, which will be discussed further hereinbelow.

Figure 2:
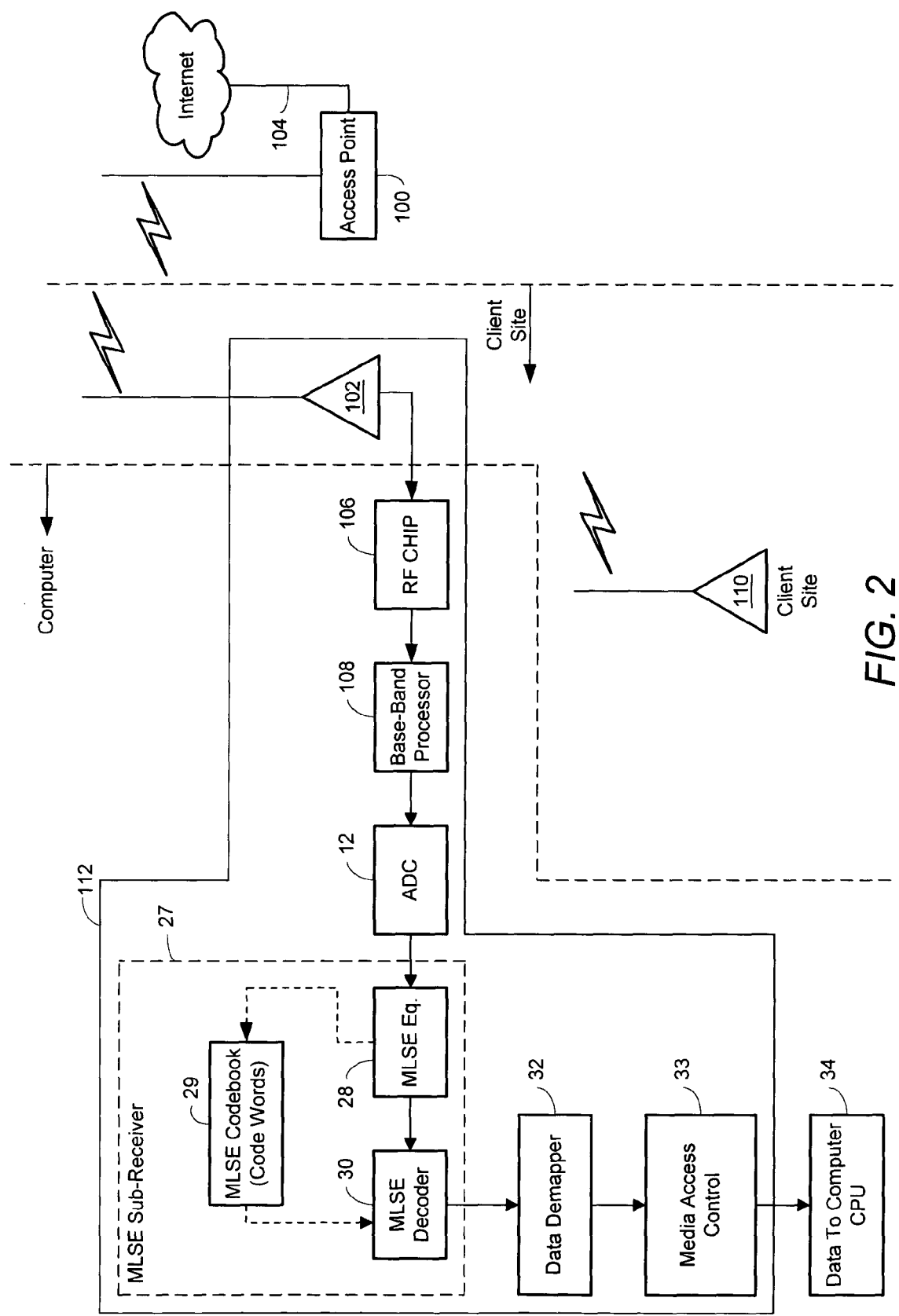
FIG. 2 shows an application of an embodiment of the present invention including further details of the embodiment of FIG. 1.

In FIG. 2, an application of an embodiment of the present invention including further details of the embodiment of FIG. 1 is shown to include an access point 100, which receives input from the Internet or local area network or the intranet, through a fast connection 104. The connection 104 may take on various known forms, such as Digital Subscriber Line (DSL), Ethernet, cable modem, etc. The access point 100 communicates with a client antenna 102. It should be noted that the devices shown to the left of the access point 100 are referred to as a part of the client site, as the client will be receiving information transmitted by the access point 100. The devices shown within the block 112 are components included with the 802.11b modem utilized for wireless networking by the embodiment of FIG. 2. The access point 100 is remotely located to the client site. An example of an access point 100 is a base station. An example of a client site is a PC. While not shown, the access point 100 includes circuits/devices similar to that shown within the block 112.

In FIG. 2, devices shown to the left of the client antenna 102 are considered either within or somehow in close proximity to a PC or computer or any communications device capable of including the same.

The client antenna 102 is connected to an Radio Frequency (RF) chip 106, the latter for receiving signals in the RF range and coupling the same onto a baseband processor device 108 for conversion of the received RF signal to baseband. Signals within the baseband range are far easier to process than at RF ranges. The baseband processor device 108 is coupled to the ADC circuit 12 for conversion of the baseband signal to digital format, as discussed relative to FIG. 1.

In FIG. 2, the output of the ADC circuit 12, referred to herein as the incoming signals, is shown coupled to the input of the MLSE equalizer device 28. The device 28 and the device 30 and the MLSE codebook (or codewords) storage location 29 collectively comprise the MLSE sub-receiver 27. The codebook storage location 29 stores codewords comprising a codebook generated by the device 28 and provides these codewords to the device 30 for use thereof. It should however be noted that some circuits, as shown in FIG. 1, are intentionally absent in FIG. 2 for the sake of simplicity. Thus, the circuits shown and discussed relative to FIG. 1 that are shown between the ADC circuit 12 and the equalizer device 28 are not shown in FIG. 2.

The equalizer device 28 is shown coupled to the decoder device 30, which is coupled to the data demapper circuit 32. The output of the demapper circuit 32 is shown coupled to a media access control 33 and the latter is connected to the computer CPU 34. The functions of the demapper circuit 32 and the CPU are discussed relative to FIG. 2. The media access control 33 provides high-level functions, such as power savings, data rates, system timing, etc.

At this point, a brief discussion of the coding scheme, complementary code keying (CCK), utilized by an 802.11b is in order. Coding is basically a way of inserting redundancy into raw data (the data to be transmitted) in an effort to improve the robustness of communication. This is particularly of significance in wireless systems, such as the 802.11b although communication rate is reduced by the effects of coding.

The 802.11b utilizes quadrature phase shift keying (QPSK) as a modulation scheme for CCK coding. An uncoded QPSK carries two bits per one QPSK chip.

Generally, a symbol is also referred to as a codeword. Codewords are the ideal data sequences that are sent by the access point 100, in FIG. 2, and would be received by the receiver under perfect channel conditions. All of the possible codewords of a given data rate constitute a complementary code keying (CCK) codebook. For example, at a data rate of 11 Mbits/sec., all of the codewords of this rate make up its codebook. In the present invention, the MLSE equalizer device 28 generates the MLSE codewords or codebook for any given rate.

Eight chips of QPSK are employed by CCK coding to form a symbol at a data rate of 11 Mbits/sec. and eight chips (or eight bits) are sent per symbol at a data rate of 11 Mbits/sec., whereas, four bits per symbol are sent at a data rate of 5.5 Mbits/sec. Yet at the latter rate, while there are four bits/symbol, there are nevertheless eight chips per symbol.

Altogether, there are 256 symbols at 11 Mbits/sec. CCK data rate, whereas, there are altogether 16 symbols at 5.5 Mbits/sec. The exact code sequence of CCK is well defined in a publication by IEEE for Standard 802.11b published in 1999 as a Supplement to IEEE Standard for Information Technology—Telecommunications and Information Exchange Between Systems—Local and Metropolitan Area Networks—Specific Requirements—entitled "Part 11: Wireless LAN Medium Access Conrol (MAC) and Physical Layer Extension in the 2.4 GHz Band".

CCK is a type of block coding. Assuming that the minimum square Euclidean distance (MSED) QPSK is one, the MSED at a data rate of 11 Mbits/sec. using CCK coding is four and the MSED at a data rate of 5.5 Mbits/sec. using CCK coding is eight. The MSED is generally calculated by the equation $\min_{x,y \in C, x \neq y} \|x-y\|^2$, where C is a codebook and x, y are distinct codewords. This is the minimum squared norm of any two codewords. In QPSK, there are four symbols (codewords). Assuming the labeling of the four symbols to be $\{(\frac{1}{2}, \frac{1}{2}), (-\frac{1}{2}, \frac{1}{2}), (-\frac{1}{2}, -\frac{1}{2}), (\frac{1}{2}, -\frac{1}{2})\}$, then the equation yields the minimum squared Euclidean distance to be 1.

Figure 3:
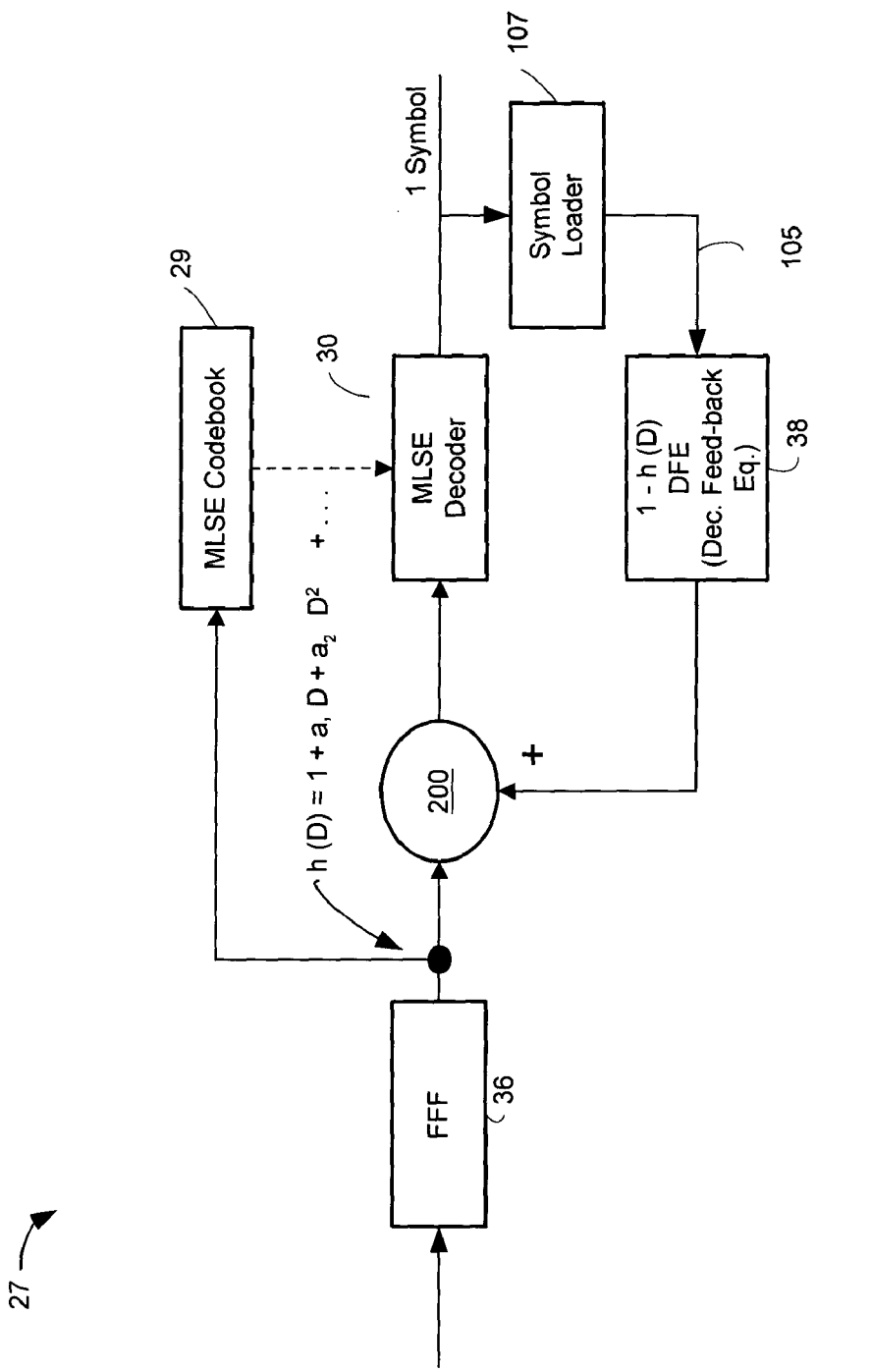
FIG. 3 shows a high level diagram of the equalizer device 28 coupled to the MSLE codebook 29.

There is a 1-symbol delay from the decoder device 30 back to the equalizer device 28. After a determination is made by the decoder device 30 as to which particular codeword was sent, the particular codeword is sent back to the device 28 to subtract the effect of the previous symbol on the in-coming symbol. This 1-symbol delay is shown as the symbol loader 107 in FIG. 3. In FIG. 3, the feedback circuit 38 is shown to perform the mathematical function '1−h (D)' where $h(D)=1+a_1D+a_2D^2+ \ldots$ h(D) is generated at the output of the feedforward circuit 36 and is referred to as the residual channel response. The terms $a_1D+a_2D^2+\ldots$ in h (D) represent the inter-chip interference (ICI) within the residual channel response h(D).

The residual channel response is used to build the MLSE codebook, stored within the location 29, and as shown in FIG. 3, the MLSE codebook is provided to the MLSE decoder device 30.

The output of the device 30 is provided to the input of a symbol loader 107, which illustrates the 1-symbol delay discussed hereinabove of the symbol generated by the decoder device 30. The 1-symbol delayed decoder output 105 is then provided to the input of the feedback circuit 38.

The effect of the previous symbol is subtracted at the summation junction 200. Even though, the summation appears to be adding, it is adding a '−h(D)', which in effect is the subtraction of the previous symbol. This aids in removing inter-symbol interference. FIG. 3 shows a very high level diagram of the equalizer device 28 (decision feedback equalizer) that will be explained in further detail hereinbelow.

In operation, after receiving the last chip of a symbol, a decoded symbol is loaded into the feedback circuit 38 by the symbol loader 107 at one time. When receiving other than the last chip, since no symbol is decoded, zeroes are loaded into the feedback circuit 38 by the symbol loader 107. The operation of the feedback circuit 38 removes the effect of the zeroes on the sub-receiver 27. In other words, outside of a symbol or for lengths longer than a symbol, the feedback circuit 38 will take care of or remove or mitigate the effects of inter-chip interference but the decoder device 30 and the MLSE codebook mitigate the effects of inter-chip interference within a symbol.

Figure 4:
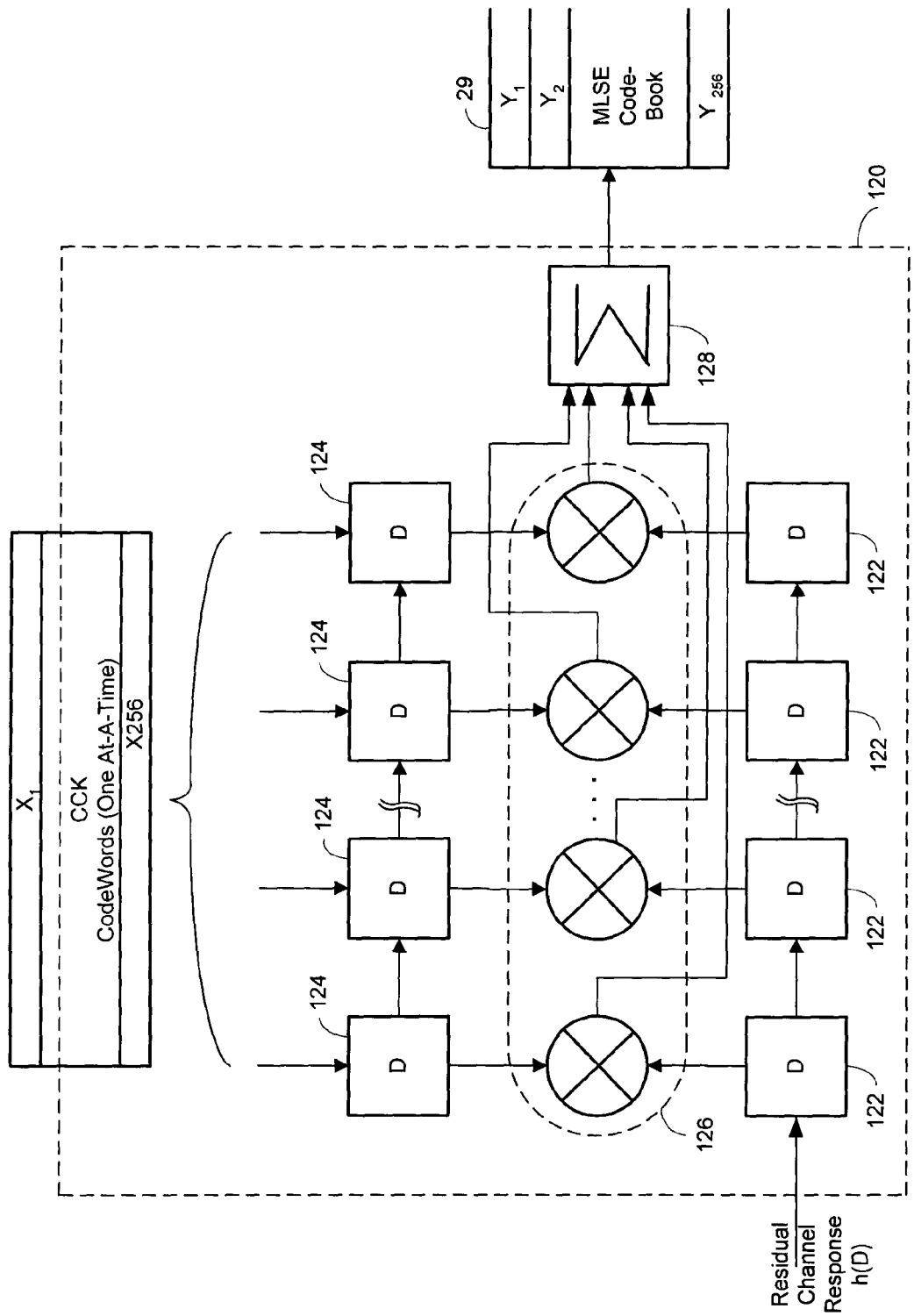
FIG. 4 shows a block diagram of a conventional convolution circuit 120 employed by an embodiment of the present invention for the construction or generation of MLSE codebook.

In FIG. 4, a convolution circuit 120 is shown in accordance with the performance of convolution of the residual channel response h(D), and known codewords, as defined in the IEEE document indicated hereinabove, in accordance with the data rate being employed. Such a convolution function is represented in mathematical form as Y=X*h(D). Y being the result of the convolution or that which is at 29, X representing the known CCK codewords being input to the delays 124 and * representing a convolution function. The output of the convolution function yields more than 8 terms, only the first eight of which are utilized with the remainder discarded. Thus, the output of the convolution function is truncated to eight as is then the codewords within the MLSE codebook storage location 29. The truncated terms are not needed because for ICI that is longer than the duration of one symbol (8 chips in the case of CCK), the feedback circuit 38 will remove the ICI after a symbol is decoded and becomes a known value to the receiver.

In FIG. 4, an input, the residual channel response, is shifted into the delays 122, each delay being a unit of time delay and CCK codewords are input to the delays 124 with each delay being a unit of time. The CCK codewords are provided to the delays 124 one-at-a-time. The output of plurality of delays 124 are multiplied by the shifted or delayed residual channel response using the multipliers 126. The output of each of the multipliers 126 is then added utilizing the summer 128. At the summer 128, eight chips are generated. Each time a codeword is multiplied and added with a delayed version of the residual channel response, an MLSE codebook is generated. For each 256 codewords, the residual channel response h(D) is delayed 8 times, or goes through 8 delays 122.

Every CCK codeword causes a MLSE codeword to be generated.

The codewords that are provided to the delays 124 are the ideal codewords for the 802.11b known in advance or predetermined. The codewords are stored in a storage location 29 shown in FIG. 2. That is, they are all of the possible symbols that the in-coming data can represent. The residual channel response is continuously shifted through the delays 122. In 11 Mbits/sec CCK, a total of 256 different MLSE codewords are generated to form a MLSE codebook and ultimately the decoded transmitted data is found by finding the minimum distance (or maximum likelihood) between the various codewords and the received equalized data, as will be obvious shortly.

The convolution circuit of FIG. 4 is a conventional convolution function that is convolving CCK codewords with the residual channel response to produce MLSE codebooks. Each 256 CCK codewords comprise a CCK codebook and each 256 MLSE codewords comprise an MLSE codebook.

In operation, when all of the codewords are passed through the equalizer device 28, the data can be accurately detected by a comparison to all of the different codewords and a determination as to which codeword matches the data. A detected match determines the correct identity of the data. This is perhaps best understood relative to FIG. 5.

Figure 5:
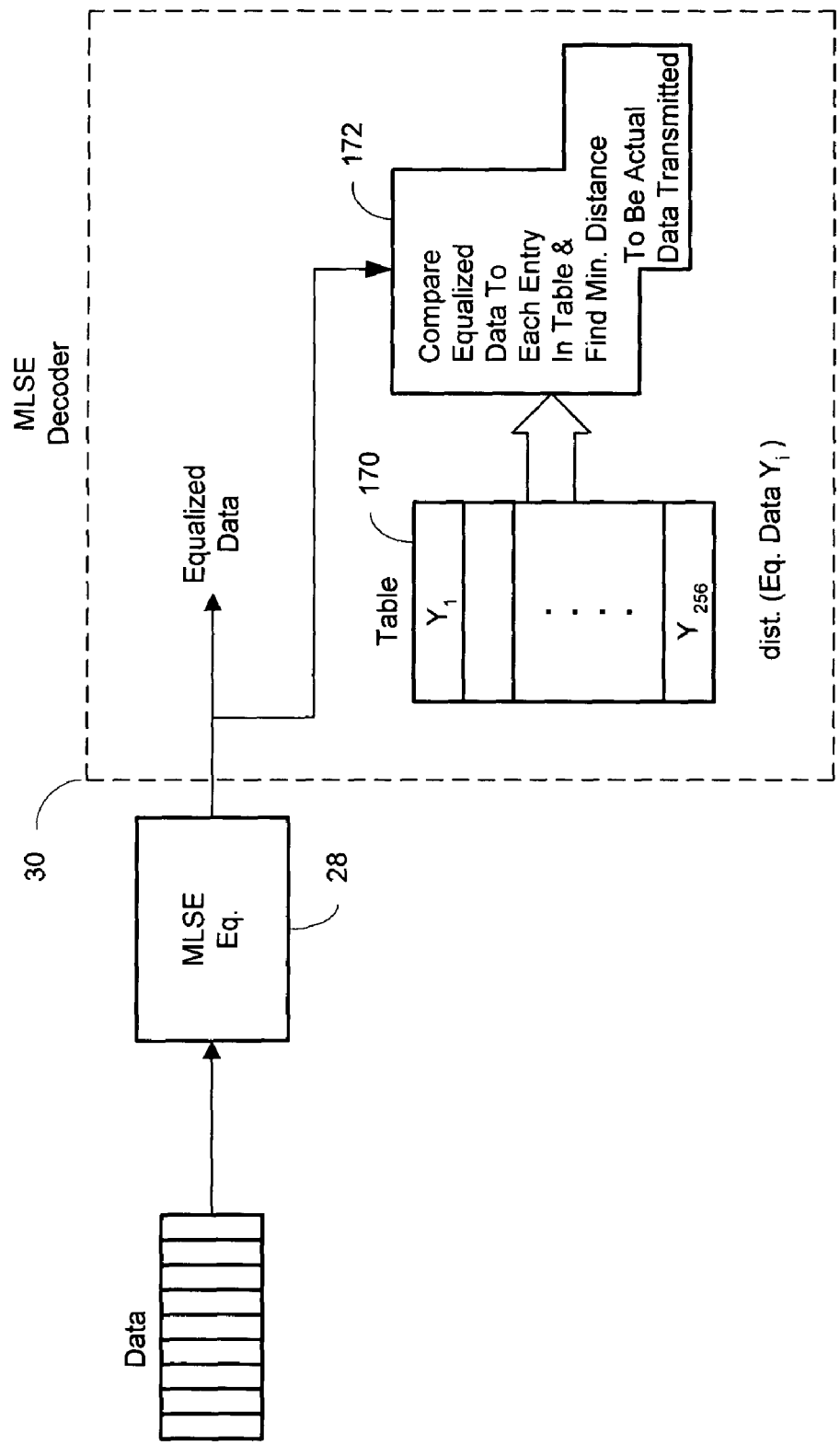
FIG. 5 illustrates further details of the decoder device 30 in accordance with an embodiment of the present invention.

In FIG. 5, the input data is shown as input to the equalizer device 28, which essentially mitigates the input data in some known manner to produce an equalized data. The latter is compared at 172 to 256 entries in a table 170. The input data received by the equalizer device 28 is in the form of samples of a packet of data. A determination is made as to which of the entries of table 170 closest resembles the equalized data. The entries of the table 170 comprise the MLSE codebook. In essence, 256 distances between the data being compared and the codewords is calculated and the minimum distance (distance (equalized data, $y_i$)) among all of the distances will be determined because then the data will be presumed to be that of the minimum-distance or maximum likelihood codeword found. The codeword found will have a particular index associated therewith and according to this index, the decoded transmitted data is determined by referring to the CCK codebook with the index to find the corresponding CCK codeword.

The comparison of 172 is not truly a comparison, rather, it is a calculation of the MSED between the equalized data and the codewords $y_i$ or dist (equalized data, $y_i$). Each of the $y_i$ is a symbol and if the equalized data was represented as $r_1, r_2 \ldots r_8$ for each symbol and for example the first codeword symbol $y_1$ in table 170 was represented as $y_{11}$, $y_{12}, \ldots, y_{18}$, the Euclidean Distance (ED) for the first symbol would be $y_1 = \| \|(r_1-y_{11})\| \|^2 + \|(r_2-y_{12})\|^2 + \ldots + \|(r_8-y_{18})\|^2$ where $r_i$ and $y_{ij}$ are complex numbers and $\| \| \|$ is a normalization function such that $\| \| f(\ )\| \|^2$ is the square of the norm of $f(\ )$. Assume the result of this calculation to be $y_m$, the index m is used to select the corresponding CCK codeword from the CCK codebook and the decoded transmitted data is determined.

It should be noted that while in the embodiment of FIG. 5, MSED is used to determine the decoded transmitted data; maximum likelihood between the equalized data and the codewords in table 170 may be used in alternative embodiments. In yet other embodiments, any distance may be used.

A direct computation can show that the complexity of the MLSE decoder is 512 multiplications and 1024 additions for every chip. This number can easily dominate the complexity of the whole receiver system.

Figure 6:
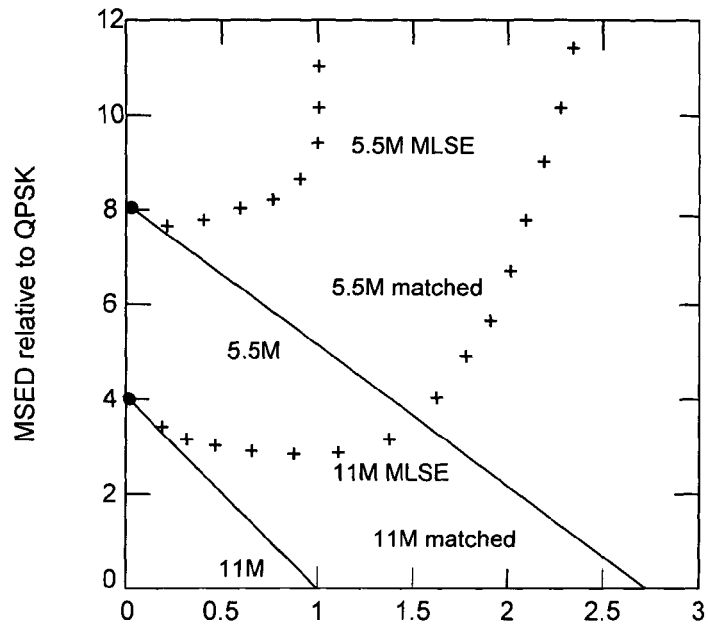
FIGS. 6 and 7 show graphs of the performance of a prior art system vs. the performance of an embodiment of the present invention.
Figure 7:
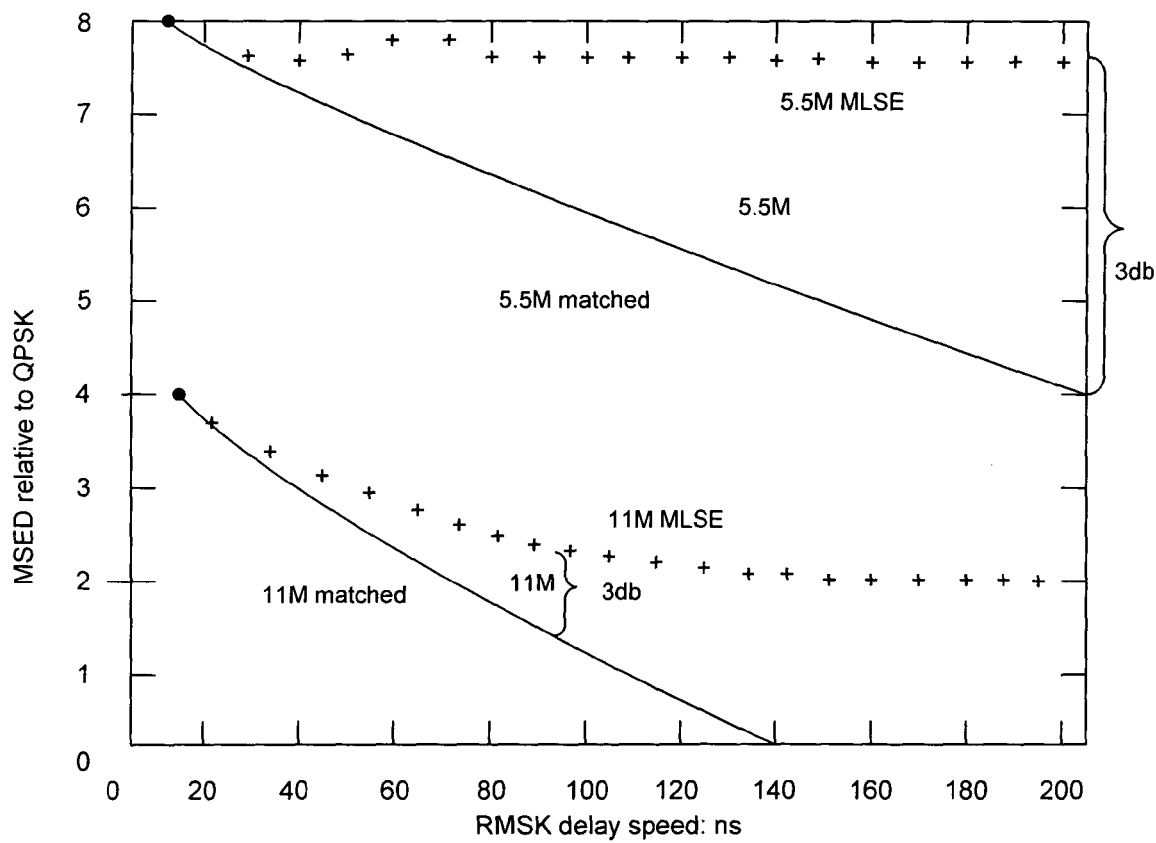

FIGS. 6 and 7 show graphs of the performance of an embodiment of the present invention with that of the prior art. The solid lines represent the performance of a prior art technique whereas the lines having plus or "+"s represent the performance of an embodiment of the present invention. There are two sets of lines for two different bit rates, 11 Mbits/sec and 5.5 Mbits/sec. The x-axis represents the values that 'a' can have, 'a' being for example, the coefficient that is multiplied by 'D' in the equation for $h(D)=1+a_1D$ relative to FIG. 3. As shown in FIG. 6, in the case of 11 Mbits/sec., when a=1, the prior art system introduces so much inter-symbol interference that use of the same will essentially yield in operation of the wireless receiver in detecting data, whereas, the performance of the embodiment of the present invention shows a substantially better performance. At the point where the solid lines hit "0" of the y-axis, the prior art system is inoperable because there are two symbols that have the same distance and the data is not retrievable. An example of this problem is stated hereinabove with respect to factory or cubicle operations wherein multi-path communication channel effects degrade detection of data when using prior art techniques and methods. In fact, in the present invention, neither inter-symbol interference nor multi-path communication channel interferes with the accuracy of the detection of the present invention. In the case of 5.5 Mbits/sec., when a is approximately 2.7, inter-symbol interference is intolerable, whereas, the embodiment of the present invention again exhibits much improved performance.

In FIG. 7, the performance of a prior art technique, shown by solid lines, is shown against an embodiment of the present invention, shown by "+"s. The y-axis represents the MSED relative to QPSK and the x-axis represents the root mean square delay speed. As shown in FIG. 7, in the case of 11 Mbits/sec. and at the point where the RMS delay speed (in nsec) is 80 nsec., there is a 3 db difference in performance between the prior art system and the embodiment of the present invention. When the RMS delay is 140 nsec., the prior art system becomes in operable whereas the embodiment of the present invention is operable with great detection capabilities, thus, there is immeasurable difference in performance. In the case of 5.5 Mbits/sec., when the RMS delay is 200 nsec., there is again a 3 db difference in performance. It should be noted that the graphs of FIGS. 6 and 7 are hypothetical in that they do not represent actual operation results, rather, they represent theoretical performance differences between a method of prior art and the present invention.

Figure 8:
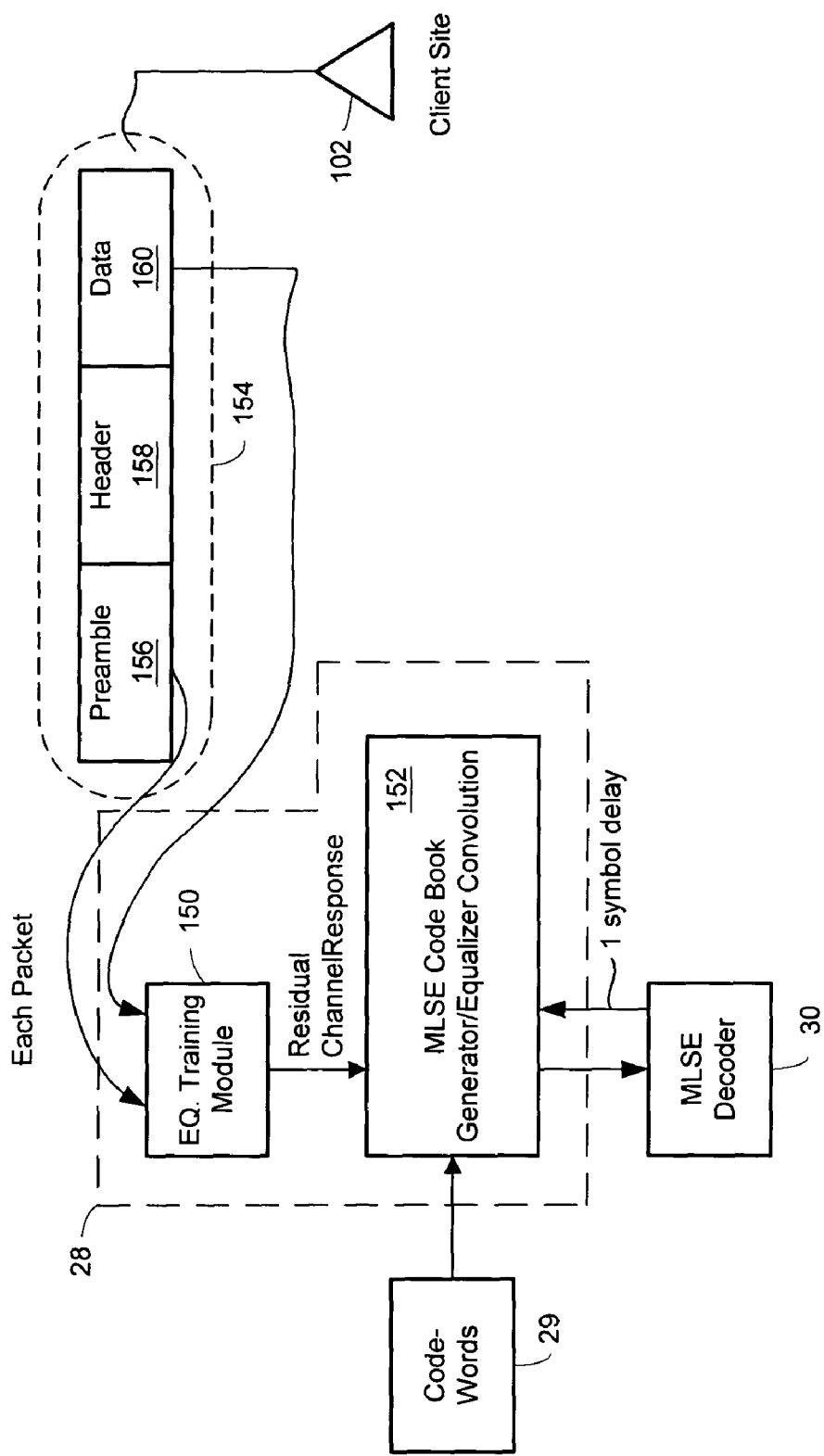
FIG. 8 shows the convolution circuit of FIG. 3 included within the block 152 of the equalizer device 28.

In FIG. 8, the convolution circuit of FIG. 4 is shown included within the block 152 of the equalizer device 28. In FIG. 8, there is shown the equalizer device 28 coupled to input data, the latter of which is processed received signals initially received by the client antenna 102. The input data is actually packaged into the packet 154, which includes a preamble portion 156 followed by a header portion 158 followed by the main data portion 160. The preamble portion 156 is used to train the equalizer training module 150 shown within the equalizer device 28. The header portion 158 is used to determine which set of codewords within the stored codewords 29 to use depending on the data rate. The main data portion 160 is provided as input to the equalizer training module 150, which is discussed in further detail hereinbelow. The storage location 29 for codewords provides requisite codewords as defined by the header portion 158 to the block 152, which generates codebooks and performs convolution as discussed and shown relative to FIG. 4. The output of the equalizer device 28 is provided to the decoder device 30. The device 30, in turn, provides a one-symbol delay of decoded symbol (or selected codeword) back to the equalizer device 28.

Every time a packet of information such as 154 is received, the process described above relative to FIG. 8 is repeated, i.e. the equalizer training module 150 is trained, the codebooks are generated and the data is processed on-the-fly (or in real-time) by the decoder device 30. It should be noted that the equalizer device 28 and the decoder device 30 operate on-the-fly.

In FIG. 8, there is illustrated a 1 symbol delay from the decoder device 30 back to the block 152. After a determination is made by the decoder device 30 as to which particular codeword was sent, the particular codeword is sent back to the block 152 to subtract the effect of the previous symbol on the in-coming symbol.

Figure 9:
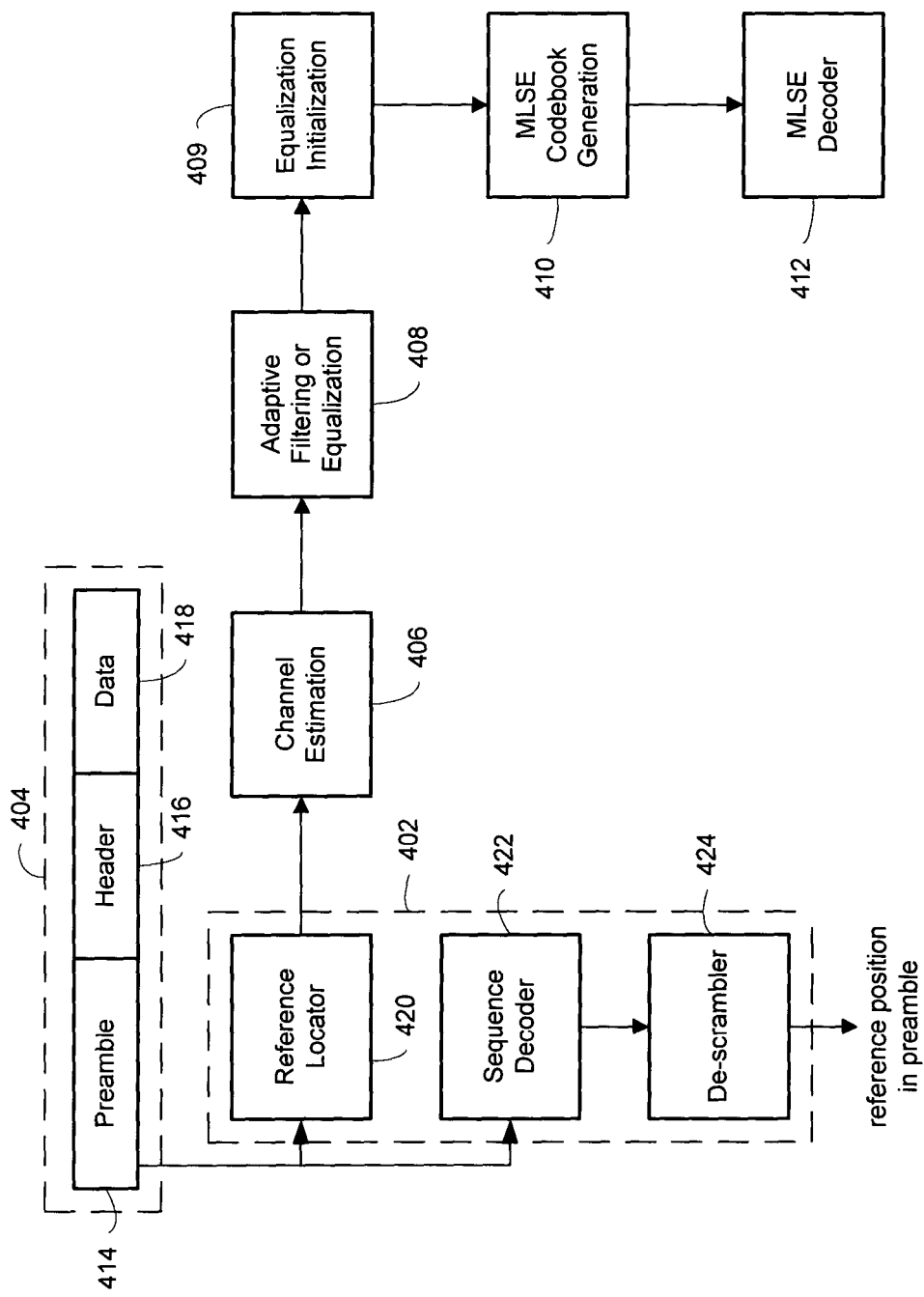
FIG. 9 shows a block diagram outlining the major steps in the equalizer training process, in accordance with an embodiment of the present invention.

Referring now to FIG. 9, a block diagram outlining the major steps in the equalizer training process is shown to include a reference point identification module 402, an input data packet 404, a channel estimation module 406, an adaptive filtering or equalization module 408, an equalizer initialization module 409, and an MLSE codebook generation module 410, in accordance with an embodiment of the present invention. Also indicated in FIG. 9 is an MLSE decoder 412. Input data packet 404 includes a preamble portion 414, a header portion 416, and a main data portion 418. The reference point identification module 402 includes a reference locator 420, a sequence decoder 422, and a de-scrambler 424.

In order to train the equalizer, it is convenient to establish a known or a reference sequence. Establishing a known sequence is accomplished by identifying a position in the initial symbols of the preamble portion 414. The preamble portion 414 generally includes 72 or 144 symbols. To this end, the sequence decoder 422 decodes 7 reference bits in 7 reference symbols of the sequence of data in the preamble portion 414. An example of the sequence of data is the Barker sequence. The sequence decoder 422 transfers the 7 reference bits to the de-scrambler 424 wherein self-synchronization of the reference symbols are performed to locate the reference position in the preamble portion 414. The reference position indicates the location of the reference sequence in the preamble portion 414. In addition, the reference sequence is used to initialize the timing controls and frequency offset loops. To elaborate, if there is any frequency offset between the transmitted data and the input data packet 404, the symbols in the input data packet 404 will be received with a phase offset that will change linearly with time. Once the symbols are decoded, the phase and the rate of phase change may be measured and used to initialize the frequency (or carrier) offset loop. A similar procedure may be carried out to initialize the timing offset correction loop. The reference locator 420 transfers the known sequence to the channel estimation module 406.

The known sequence and the data from the preamble portion 414 are used in the channel estimation module 406 to calculate the energy associated with each channel of data. Energy calculations for each channel of data are used to determine optimal filter lengths in the feedback and feedforward circuits, as described in more detail hereinbelow. The length of each filter is proportional to the number of taps used therein. Thus, a shorter filter length corresponds to a lesser number of taps in the filter and a longer filter length corresponds to a greater number of taps. The channel estimation module 406 uses an algorithm such as the least mean square (LMS) algorithm to calculate the energy for each data channel.

Information from channel estimation module 406 and data from the preamble portion 414 are used in the adaptive filtering or equalization module 408 to obtain the feedforward and feedback circuit coefficients for the receiver. The output of the equalization module 408, including the residual channel response, is used both in the equalizer initialization module 409 and in the MLSE codebook generation module 410 to initialize the equalizer and to generate the MLSE codebook, respectively. Generation of the MLSE codebook completes the equalizer training process. The output of the MLSE codebook generation module 410 is used in the MLSE decoder module 412 for subsequent decoding, as described in detail hereinbelow.

Figure 10:
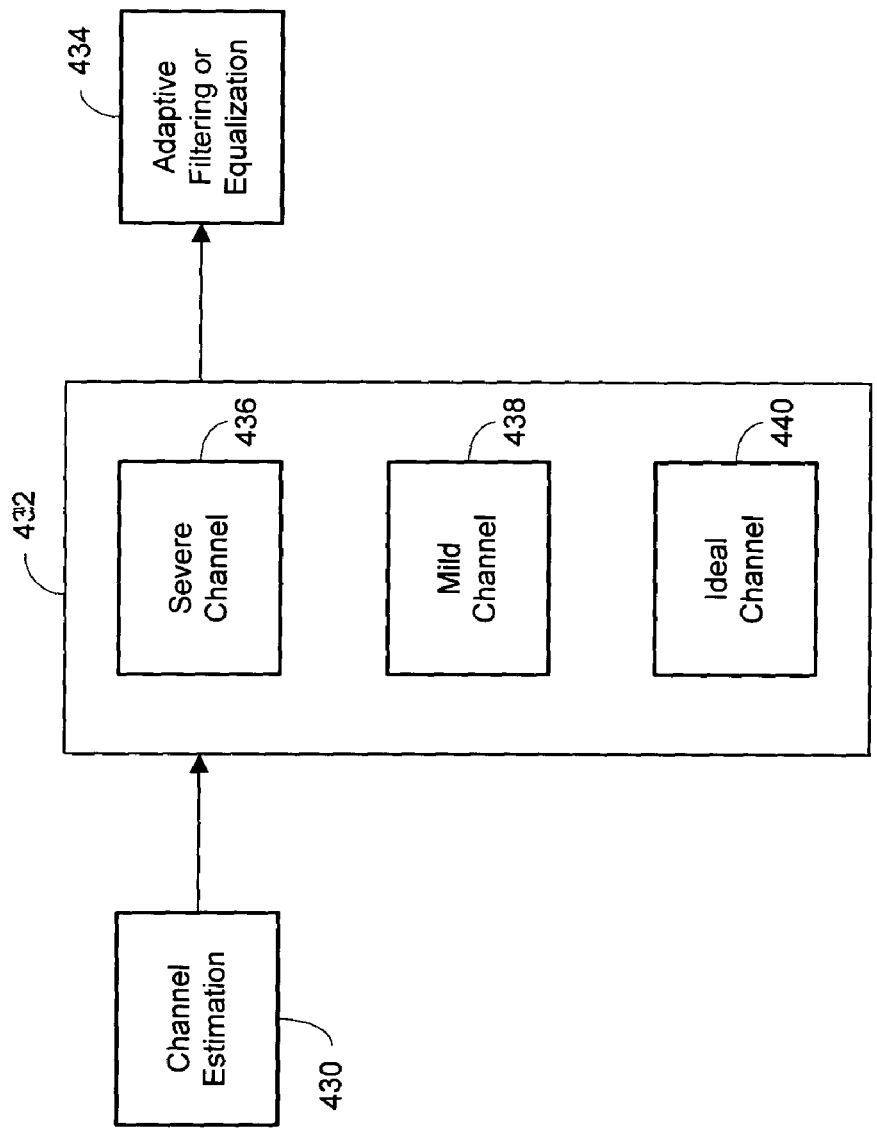
FIG. 10 shows a block diagram outlining the steps in determination of the optimal equalizer parameters, in accordance with an embodiment of the present invention.

Referring now to FIG. 10, a block diagram outlining the steps in determination of the optimal equalizer parameters is shown to include a channel estimation module 430, a channel output block 432, and an adaptive filtering or equalization module 434, in accordance with an embodiment of the present invention. The channel output block 432 includes a severe channel 436, a mild channel 438, and an ideal channel 440. The equalizer parameters comprising filter coefficients for the feedback and feedforward circuits may be adapted to the output of the channel estimation module represented in the channel output block 432, as described below.

Specifically, the severe channel 436 indicates a channel whose energy spans several symbol lengths. Accordingly, the lengths of the filters in the feedback and feedforward circuits are increased to achieve a more efficient equalization. On the other hand, the mild channel 438 indicates a data channel with energy that spans a few symbol lengths for which shorter filter lengths in the feedback and feedforward circuits are selected. Furthermore, the ideal channel 440 corresponds to a data channel with a very short energy span for which the filter lengths in the feedback and forward circuits are selected to be shorter than those for the mild channel 438.

In another embodiment of the present invention the equalizer parameters are so tuned to the output of the channel estimation module 430 that an optimal combination of the feedback and feedforward circuits is achieved for the equalizer. For example, in one extreme case, it is possible to tune the equalizer parameters so that only the feedback circuit is used while the data passes through the feedforward circuit unaltered. In another extreme case, only the feedforward circuit is used for equalization while the feedforward circuit is completely circumvented. An example of the latter case arises in equalizing an ideal Gaussian channel wherein it is preferable to use the feedforward circuit only without engaging the feedback circuit. The information from the channel output block 432 is used in the equalization module 434 for adaptive training of the equalizer, as described hereinabove.

Figure 11:
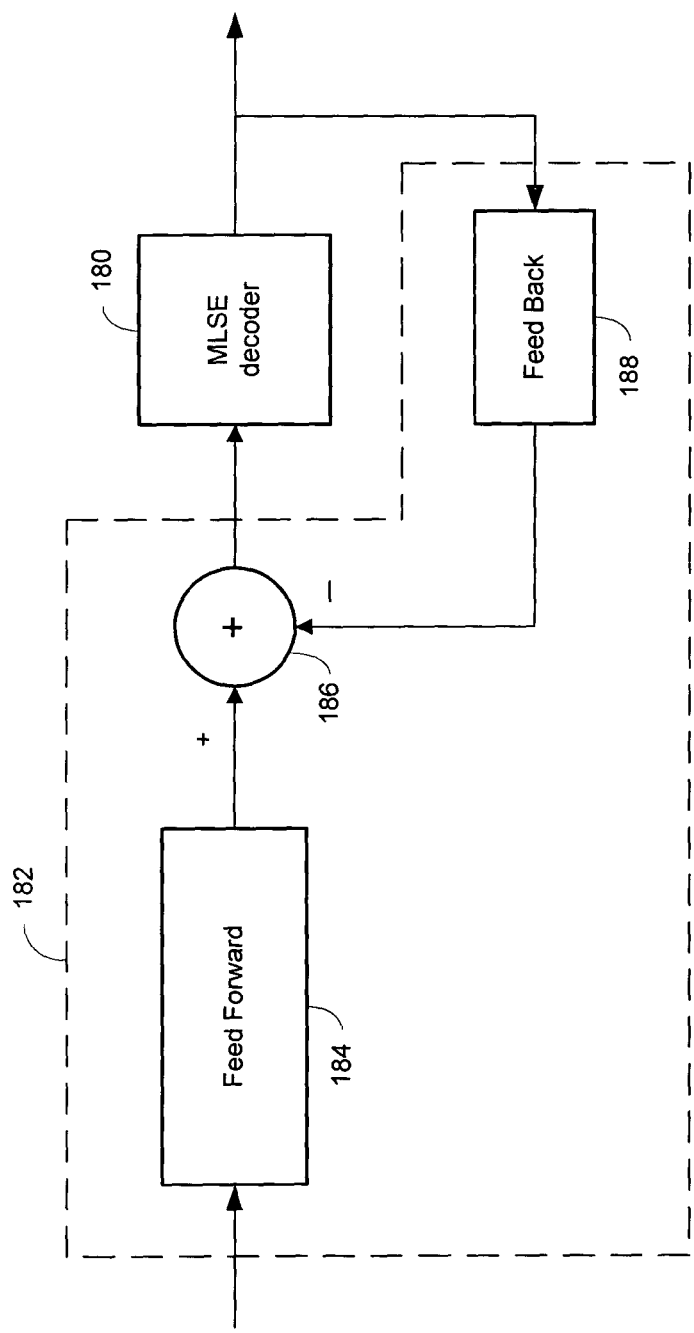
FIG. 11 shows a high level diagram of an MLSE equalizer and decoder, in accordance with an embodiment of the present invention.

Referring now to FIG. 11, a high level diagram of an MLSE equalizer and decoder is shown to include an MLSE decoder 180 and an MLSE equalizer 182, in accordance with an embodiment of the present invention. The MLSE equalizer 182 includes a feedforward circuit 184 and a feedback circuit 188 both of which are connected to the MLSE decoder 180 through the summation junction 186. The MLSE decoder 180 is connected to the feedback circuit 188.

In one embodiment of the present invention the feedforward circuit 184 is an FFF circuit and the feedback circuit 188 is a DFE circuit. The FFF circuit 184 is generally a finite-duration impulse response (FIR) filter circuit that performs channel "shortening" on the incoming data and is used to compute the codebook for the MLSE decoder 180. Channel "shortening" refers to the function of an equalizer, such as an FIR filter circuit, whereupon operating on or convolving with a particular channel the equalizer acts to "shorten" the impulse response of the channel. The MLSE equalizer 182 operates in conjunction with the MLSE decoder 180 to mitigate inter-symbol interference that may result from the effects of multi-path communication channel during the reception of the modem signals. Reduction of inter-symbol interference results in optimal performance of the modem device. Reduction in inter-symbol interference is achieved through the use of the feedback circuit 188.

Specifically, the MLSE decoder 180, upon determining a particular codeword in the incoming data, sends the codeword back to the feedback circuit 188. The effect of the previous symbol is subtracted from the incoming symbol at the feedback circuit 188. The output of the feedback circuit 188 and the feedforward circuit 184 are added at the summation junction 186 in order to minimize the inter-symbol interference. Additionally, the decoding process is rendered more robust by removing residual modeling uncertainty that may result from imperfect channel estimation. To achieve such improvements, the outputs of the feedforward circuit 184 and the feedback circuit 188 are equalized. To optimize the effects of equalization, the MLSE equalizer is trained adaptively using the preamble portion of the input data.

Figure 12:
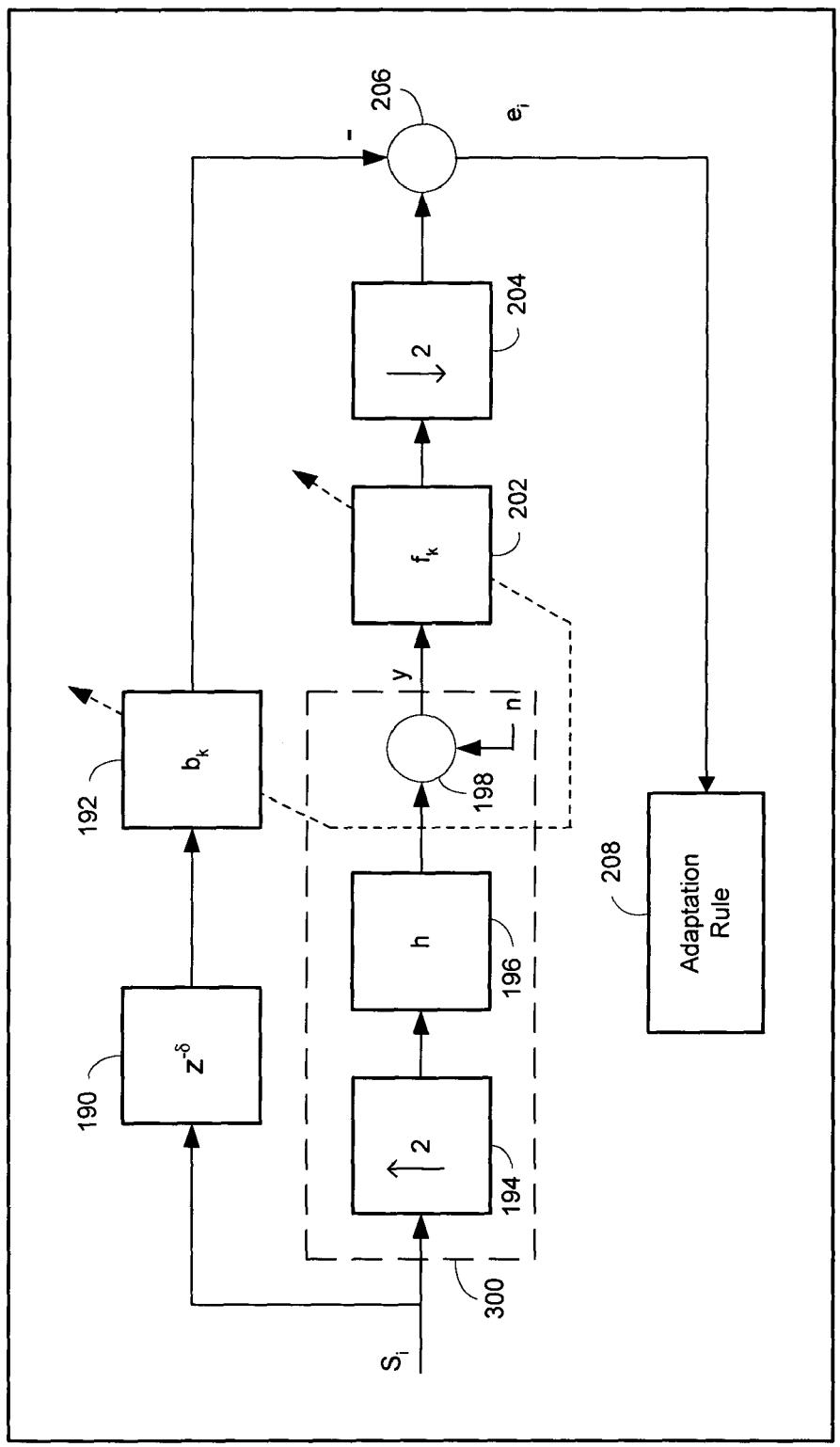
FIG. 12 shows an MSLE equalizer-training diagram, in accordance with an embodiment of the present invention.

Referring now to FIG. 12, an MSLE equalizer-training diagram is shown, in accordance with an embodiment of the present invention. The sequence $s_i$ corresponding to the symbols is transmitted to the MLSE equalizer 182 as part of the preamble portion of the input data. The $s_i$ is given a pre-selected delay $\delta$ as shown in step 190 and processed by the feedback circuit at step 192 to generate a feedback circuit output using feedback filter coefficients $b_k$, where k is the symbol rate, such as 1 MHz. In addition, incoming signals $y_i$ are processed by the feedforward circuit 184 using feedforward filter coefficients $f_k$, as shown in step 202. The incoming signals are generally noisy, in part due to analog-to-digital conversion. The addition of noise is indicated at the summation junction 198, wherein the channel of data in 196 is added to the noise n to generate the incoming signals $y_i$.

Note that the incoming signal y is 2× over-sampled as indicated in 194, however, since the feedforward circuit is fractionally spaced as shown in 204, the feedforward circuit output is still at the chip rate, e.g. 11 MHz. In 802.11b MLSE decoder, every 11 chips correspond to one symbol. To adaptively train the MSLE equalizer the difference between the feedforward circuit output and the feedback circuit output, as represented by the error signal $$e_j = f^* y_j - b^* s_j, \quad (1)$$

is minimized, where the j index refers to the jth iteration within a chip. In the embodiment of the present invention, the error signal is minimized by allowing both $b_k$ and $f_k$ to adapt simultaneously in order to reduce the effects of inter-symbol interference.

Equation (1) may be written as $$e_j = f^* y_j - \beta^* \underline{s}_j - B_0 s_{0j}. \quad (2)$$

Vector $\beta$ denotes the vector b with the leading tap $B_0$ missing. The leading tap is set to a fixed value and omitted from $\beta$, therefore not being adapted with the other filter coefficients. The reason for such an omission is to avoid the trivial solution, i.e. f=0 and b=0⇒$e_j$=0. The vector s has the leading chip $s_{0j}$, corresponding to the leading tap, omitted as well with the resulting decimated vector designated as $\underline{s}$.

The filter coefficients and data vectors may be combined to rewrite equation (2) as $$e_j = g_k^* u_j - B_0 s_{0j}, \quad (3)$$

where, $$g_k^T = [f_k \beta_k] \text{ and } u_j^T = [y_j \underline{s}_j].$$

The filter coefficients are updated in two steps. In the first step, coefficient accumulator, G(k), is updated during the $k^{th}$ symbol as $$G(k+1) = G(k) + \Sigma \mu \nabla_j, \quad (4)$$

where, the instantaneous gradient $\nabla_j$, corresponding to the $j^{th}$ chip, is defined by $\nabla_j = u_j e_j^*$ and $\mu$ is a small number referred to as the adaptation constant. The summation index j, in equation (4), ranges over the number of chips in a sequence, which for the Barker sequence corresponds to 11. In another embodiment of the present invention more than one adaptation constant is used for adapting the filter coefficients. In the second step, the updated filter coefficients for the $k^{th}$ symbol, obtained by accessing the upper 8-bits of the coefficient accumulator, are given by $$g_{k+1} = G(k)[1:\text{end}, 1:8], \quad (5)$$

where the upper 8 bits of each element of the vector G(k) are used in determining $g_{k+1}$. The adaptation constant $\mu$ has a value in the general range of $2^{-14}$ to $2^{-16}$, to ensure that the adaptation scheme does not diverge and to allow for additional noise smoothing. The end result of the adaptation scheme described hereinabove is a set of filter coefficients that are used to equalize the effects of multi-path communication channel, as described hereinabove.

Thus, the present invention allows the maximum performance of the 802.11b to be utilized and optimizes performance by mitigating the effects of multi-path and/or inter-chip interference.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A maximum likelihood sequence estimator (MLSE) equalizer device being included in an MLSE sub-receiver comprising:

a feedforward circuit responsive to input data, said input data including a preamble portion, a header portion and a main data portion, for processing the input data to generate a feedforward circuit output, said input data being generated from transmitted data being transmitted by wireless transmission;

a feedback circuit responsive to said input data to generate a feedback circuit output, said feedback circuit for processing said preamble portion to generate a feedback circuit output using feedback filter coefficients $b_k$, said feedforward circuit responsive to the input data for processing the same to generate said feedforward circuit output using feedforward filter coefficients $f_k$; and an equalizer training module responsive to said feedforward circuit output and said feedback circuit output for training said MLSE equalizer device by minimizing the difference between said feedforward circuit output and said feedback circuit output, said MLSE equalizer device being trained to generate equalized data, said equalizer training module for training said MLSE equalizer device by adapting said feedback filter coefficients $b_k$ and said feedforward filter coefficients $f_k$ to minimize the difference between said feedforward circuit output and said feedback circuit output, said MLSE sub-receiver for decoding said equalized data to generate decoded transmitted data by mitigating the effects of a multi-path communication channel due to wireless transmission of said transmitted data and for using a set of complementary code keying (CCK) codewords to generate a set of MLSE codewords, said header portion being used to determine said set of CCK codewords, said MLSE sub-receiver using said set of MLSE codewords to decode said equalized data.

2. An MLSE equalizer device as recited in claim 1 wherein said equalizer training module trains said MLSE equalizer device on-the-fly, said MLSE equalizer device generates said set of MLSE codewords on-the-fly.

3. An MLSE equalizer device as recited in claim 1 wherein said feedforward circuit being located internally to said equalizer training module.

4. An MLSE equalizer device as recited in claim 1 wherein the leading tap of said feedback filter coefficients $b_k$ is set to a fixed value.

5. An MLSE equalizer device as recited in claim 1 further including a summing junction coupled to receive the feedforward circuit output and the feedback circuit output to substantially remove inter-symbol interference associated with the feedforward circuit output.

* * * * *